(12) United States Patent
Dasher et al.

(10) Patent No.: US 6,484,529 B2
(45) Date of Patent: Nov. 26, 2002

(54) CABINET CONSTRUCTION FOR AN ICE MAKER OR OTHER REFRIGERATION APPLIANCE

(75) Inventors: James F. Dasher, Evansville, IN (US); Scott E. Roales, Wadesville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 09/836,983

(22) Filed: Apr. 18, 2001

(65) Prior Publication Data

US 2001/0035024 A1 Nov. 1, 2001

Related U.S. Application Data

(60) Provisional application No. 60/198,540, filed on Apr. 19, 2000.

(51) Int. Cl.[7] .................................................. F25C 5/18
(52) U.S. Cl. ......................................... 62/344; 62/449
(58) Field of Search ............................... 62/344, 457.1, 62/457.7, 457.8, 459, 259.1, 298, 449; 312/265.5, 265.6, 228

(56) References Cited

U.S. PATENT DOCUMENTS

| | | | | |
|---|---|---|---|---|
| 290,306 A | * | 12/1883 | Adams | |
| 1,670,959 A | * | 5/1928 | Garrett | |
| 4,087,140 A | * | 5/1978 | Linstromberg | 62/344 |
| 4,706,466 A | * | 11/1987 | Yingst et al. | 62/344 |
| 5,245,841 A | * | 9/1993 | Paul et al. | 62/344 |
| 5,517,826 A | * | 5/1996 | Duffy | 62/256 |
| 5,673,985 A | * | 10/1997 | Mitchell | 312/265.3 |
| 6,109,053 A | * | 8/2000 | Strackbein et al. | 62/298 |

* cited by examiner

Primary Examiner—William E. Tapolcai
Assistant Examiner—Mohammad M. Ali
(74) Attorney, Agent, or Firm—Robert O. Rice; Stephen D. Krefman; Thomas J. Roth

(57) ABSTRACT

A modular cabinet for an ice maker or other refrigeration appliance, having a frame formed from a base, a tub resting on the base, and a pair of opposing side panels affixed to opposing sides of side tub and base assembly and a top panel.

The refrigeration appliance has a refrigerated compartment defined by the tub, the top panel and the door. A door hingedly mounted to the frame sealingly closes the refrigerated compartment.

3 Claims, 9 Drawing Sheets

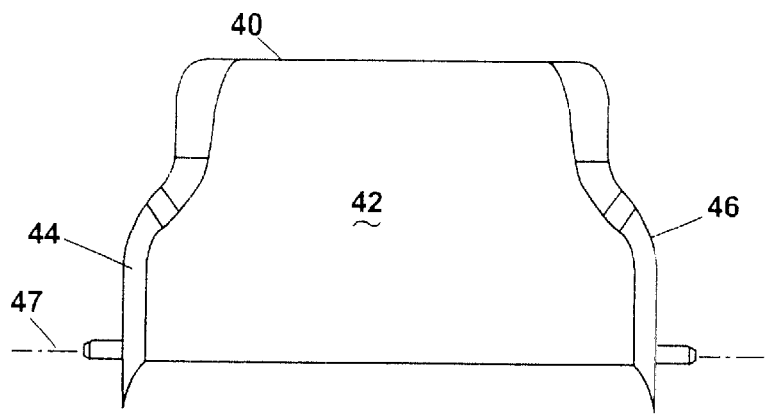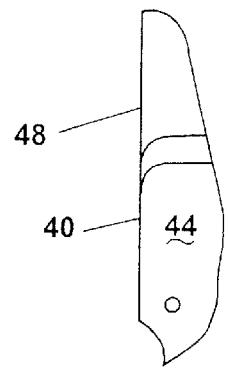
Fig. 7
Fig. 8
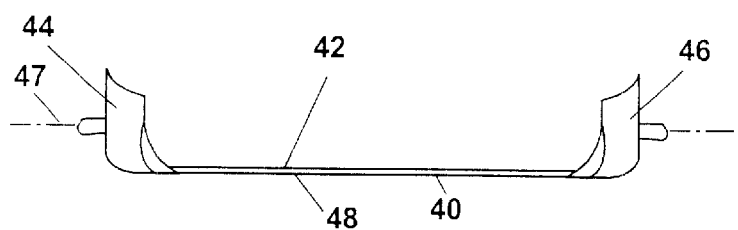
Fig. 9

US 6,484,529 B2

CABINET CONSTRUCTION FOR AN ICE MAKER OR OTHER REFRIGERATION APPLIANCE

BACKGROUND OF THE INVENTION

The present invention relates to cabinet construction for ice makers or other refrigeration appliances and more particularly to refrigeration appliances of the type generally designed for under counter installation. Such appliances typically are either miniature refrigerators, with or without a freezer compartment, or an ice maker having an ice storage compartment enclosing an ice forming and dispensing apparatus and an underlying ice storage bin.

The present invention is directed to providing a modular design for such an appliance that facilitates brand differentiation and re-use of components for creating ice makers, refrigerators and wine coolers.

The present invention also is directed to the problem of permitting easy manual access to the ice storage bin while maximizing the effective capacity of the ice storage bin and reducing the likelihood of spillage of ice.

SUMMARY OF THE INVENTION

The present invention provides a modular design for an ice maker or other refrigeration appliance wherein the frame is constructed from a base member or deck, preferably a U-shaped stamping, a tub, preferably formed of plastic, and a pair of side panels slip fit over the base and tub subassembly. A top panel is removably mounted to the top of the side panels to form the top of the frame and optionally at least partially form the top of the refrigeration compartment defined by the tub. A door is hingedly mounted to the frame such as to rotate about a horizontal or a vertical axis to selectively close said refrigeration compartment or provide access thereto.

In the preferred embodiment, the present invention further provides an ice chute or flipper hingedly mounted to the front of the tub to provide access to the ice storage bin defined by the tub while increasing the effective size of the ice storage bin. The ice chute is adapted to guide back into the ice storage bin any ice that is inadvertently dropped thereon when ice is being removed.

The chute is provided with a lower surface which cooperates with the door such as to be lowered into an open position extending outwardly of the refrigeration compartment when the door is opened and to be raised into an upper position entirely within the refrigeration compartment when the door is closed.

The present invention therefore provides a design for such an ice maker that readily facilitates brand differentiation among differently branded models of the same ice maker by providing a design sufficiently robust to permit alternative appearing access doors, and alternative control configurations, including having doors on one model that may be opened about a vertical axis for one model and doors on another that may be opened about a horizontal axis for an alternate model.

Furthermore, the present invention provides a modular design for a refrigeration appliance compartment that is easily accessible for assembly, cleaning and repair.

Furthermore, the present invention provides a modular design for an ice maker refrigeration compartment that is easily adaptable for constructing a compact under counter refrigerator or wine cooler.

These and other objects and advantages of the present invention will be apparent to those skilled in the art upon reading the following detailed description of the preferred embodiments in conjunction with the attached drawings.

BRIEF DESCRIPTION OF THE DRAWINGS

FIGS. 7, 8 and 9 are bottom, side and front elevation views of the chute of the ice maker of FIGS. 1 through 5.

DESCRIPTION OF THE PREFERRED EMBODIMENT

Figures 5, 6:
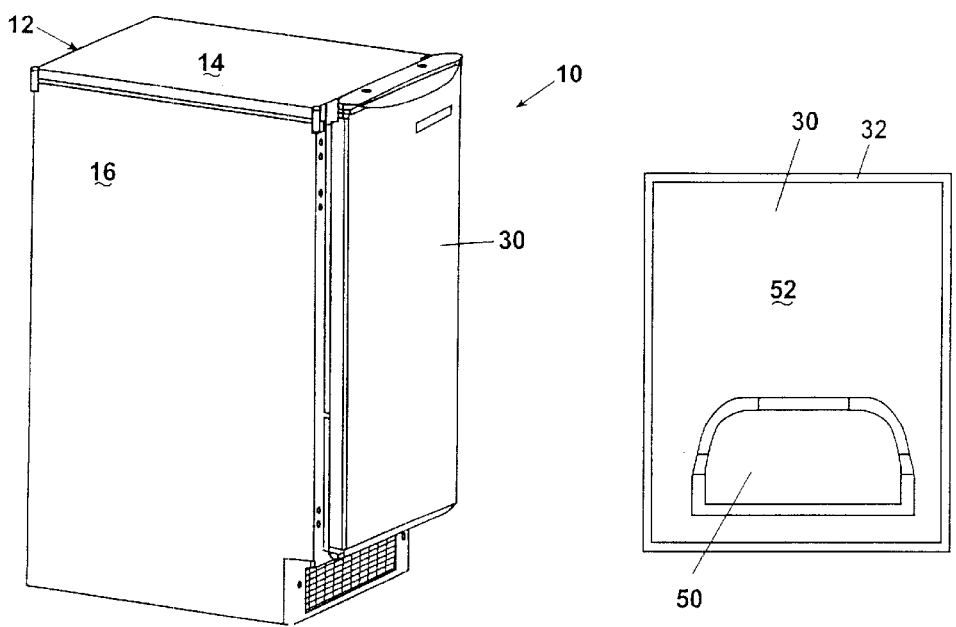
FIG. 6 is a front elevation view of the inner surface of the outer door of the novel ice maker of FIGS. 1 through 5 showing the camming element.

The present invention provides a novel and robust modular design for an ice maker as illustrated in the drawings and described herein. While features of the design can be adapted for use in larger refrigeration appliances of various types, and the claims appended hereto are not intended to be limited hereby, the preferred embodiment for carrying out the present invention comprises a compact under counter ice maker 10 having a width of between 15 inches and 24 inches, as illustrated in FIGS. 1 through 5 or a compact ice maker 10' as illustrated in FIGS. 6 and 7.

Figure 1:
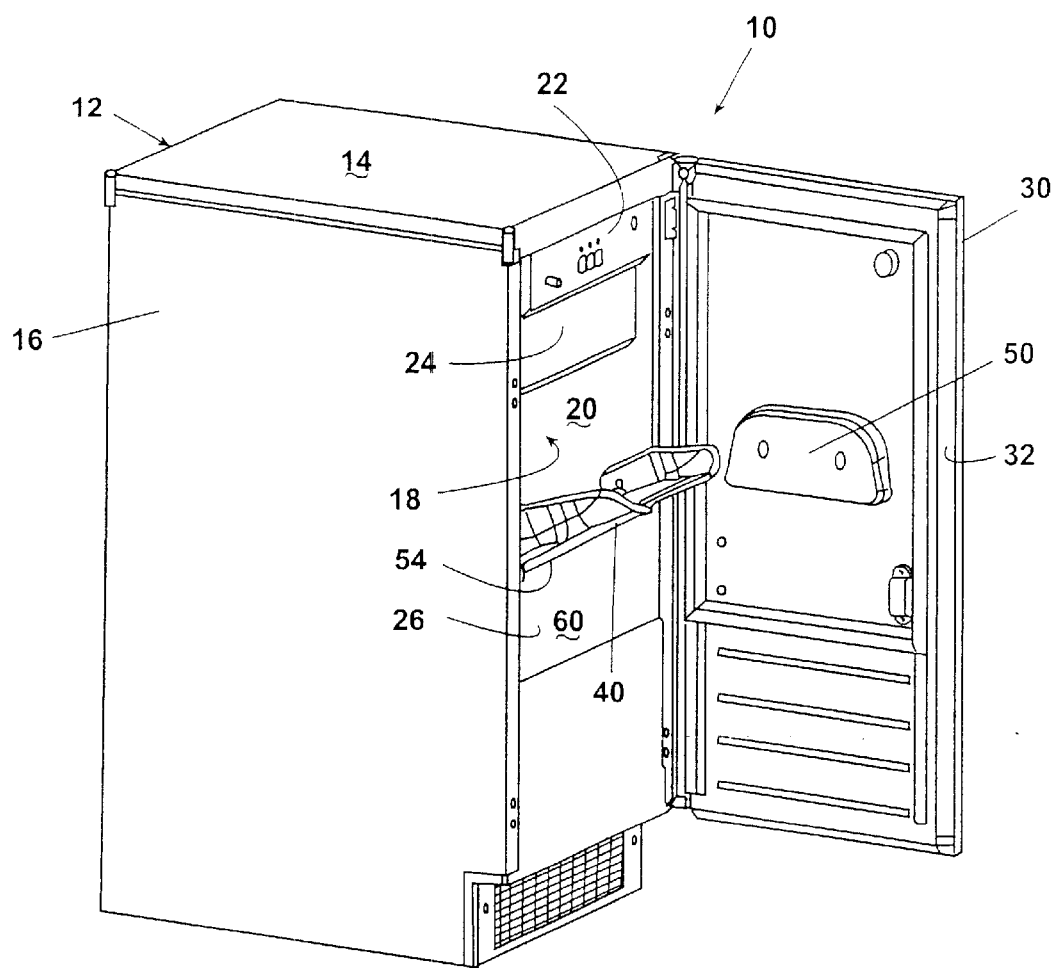
FIG. 1 is a perspective view of a first embodiment of the novel ice maker of the present invention wherein a full outer door rotates about a vertical axis, shown with the outer door and the inner door or chute open.
Figure 2:
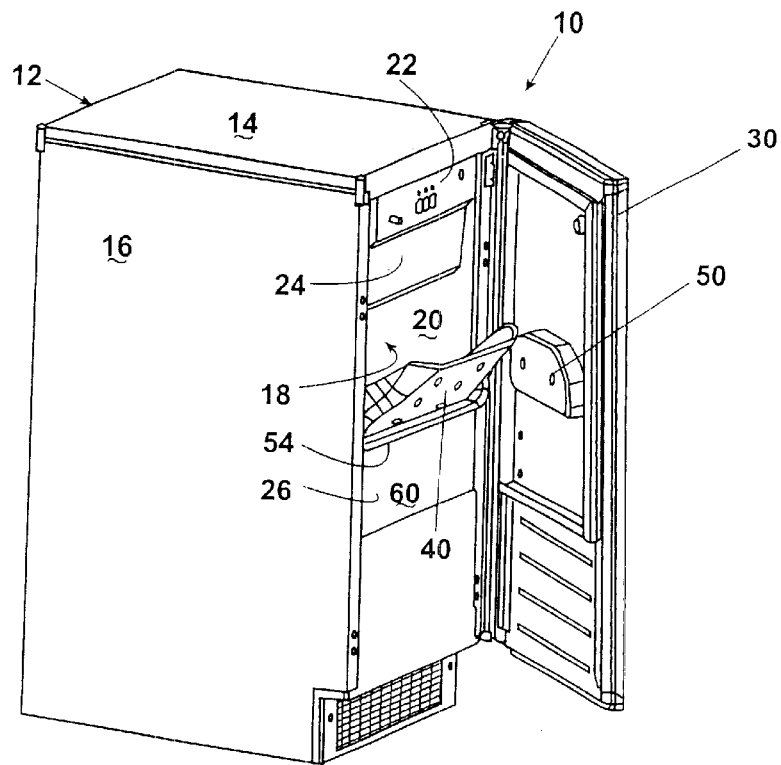
FIGS. 2, 3, 4 and 5 are perspective views of the novel ice maker of FIG. 1 illustrating the cooperation of the outer door and the flipper or inner doors of the ice maker as the outer door is progressively closed or opened.
Figure 3:
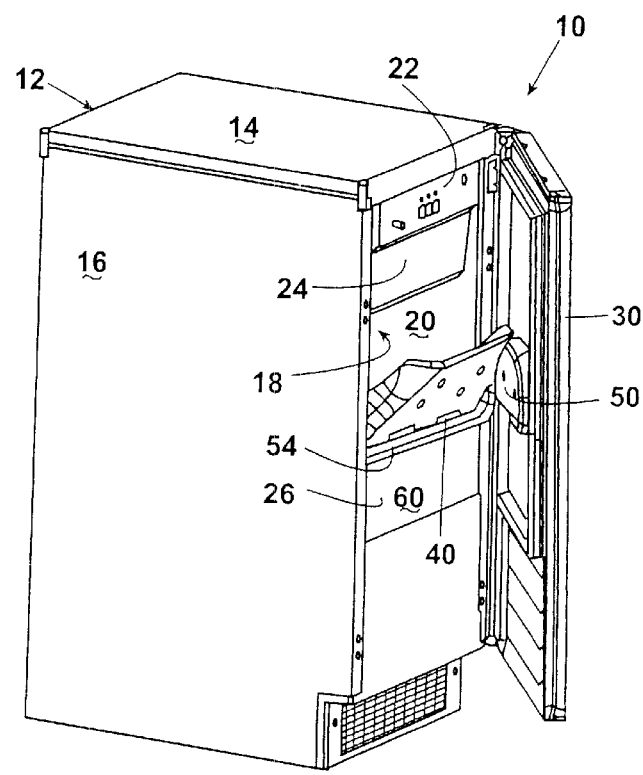
Figure 4:
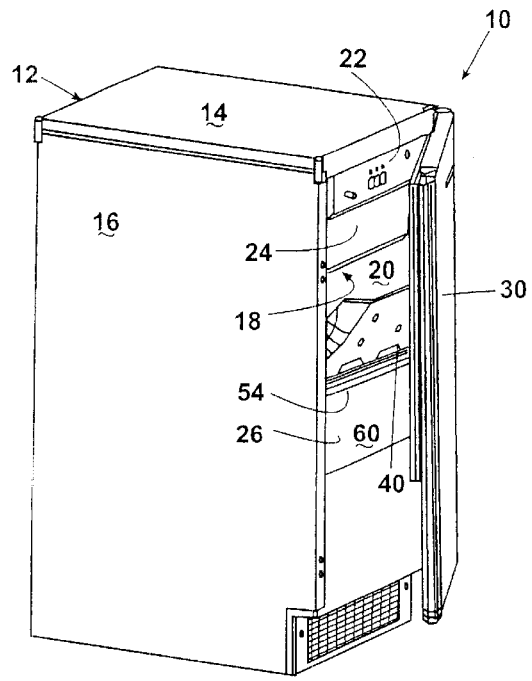

As shown in FIGS. 1 through 5, generally and in FIG. 1 in particular, an ice maker 10 has an outer housing or main housing 12 having a top wall 14, a back wall (not shown) and two side walls 16 (only one shown) defining there between a refrigerated compartment 18 having an access opening 20. As is well known in the art, the refrigeration compartment 18 contains controls 22, a cooling system (not shown), an ice forming and dispensing apparatus 24, and an ice storage bin 26 disposed below the ice dispensing apparatus.

In the preferred embodiment of the present invention, a first door or outer door 30 is hingedly attached to the main housing 12 to selectively close the access opening 20. The access opening 20 must be sufficiently large not only to permit access to the ice in the ice storage bin 26 but to permit cleaning and servicing of the ice storage bin and the ice forming and dispensing apparatus 24. As is well known, The outer door 30 is provided with a thermal seal 32 that cooperates with the main housing 12.

The ice storage bin 26 is provided with a second or inner door or chute 40 to facilitate access to the ice while reducing the likelihood of spilling ice on the floor and to increase the effective storage capacity of the ice storage bin 26.

As best shown in FIGS. 7, 8 and 9, the chute 40 has a concave and upwardly opening upper surface 42 to define a guide path for directing dropped ice back into the ice storage bin 26. In the preferred embodiment, this concavity is formed by having raised side edges 44 and 46.

The chute 40 is hingedly fastened to the ice storage bin 26 so as to rotate about a horizontal axis 47 between an upwardly oriented, generally vertical position and a lower, generally horizontal position (shown in FIG. 1).

The chute 40 is also provided with a contoured convex lower surface 48. A camming element 50, shown in FIG. 6, is mounted to the inner surface 52 of the outer door to cooperate with the lower surface 48 of the chute 40 such that, as the outer door 30 is progressively rotated, as shown in FIGS. 1 through 5, about its hinges from its open position shown in FIG. 1 to its closed position, shown in FIG. 5, the chute 40 is progressively rotated from its lower position to its upper position. The axis of rotation of the chute 40 is preferably disposed sufficiently recessed from the location of the camming element 50 such that the chute 40 is rests against the camming element in its upper position and is pulled downwardly by gravity to follow the camming element when the outer door 30 is opened.

In the lower position, the a portion of the lower surface 48 of the chute 40 rests against an abutment 54 (FIGS. 1 through 3) of the ice storage bin 26 such that the chute is angled slightly upwardly and outwardly of the refrigerated compartment 18 such as to better catch dropped ice and redirect it into the ice storage bin and to better retain ice within the ice storage bin when it is filled to capacity.

It will be appreciated by those skilled in the art that the use of the chute 40 increases the useful capacity of the ice storage bin 26 while facilitating access to its contents by effectively increasing the height of the barrier front wall 60 of the ice storage bin.

It will further be appreciated that, in the preferred embodiment, the functional concave upper surface 42 provided for guiding the ice nicely complements the functional convex lower surface 48 adapted for following the camming element 50 so as to provide a lightweight attractive and unobtrusive moldable or stampable component.

Figure 10:
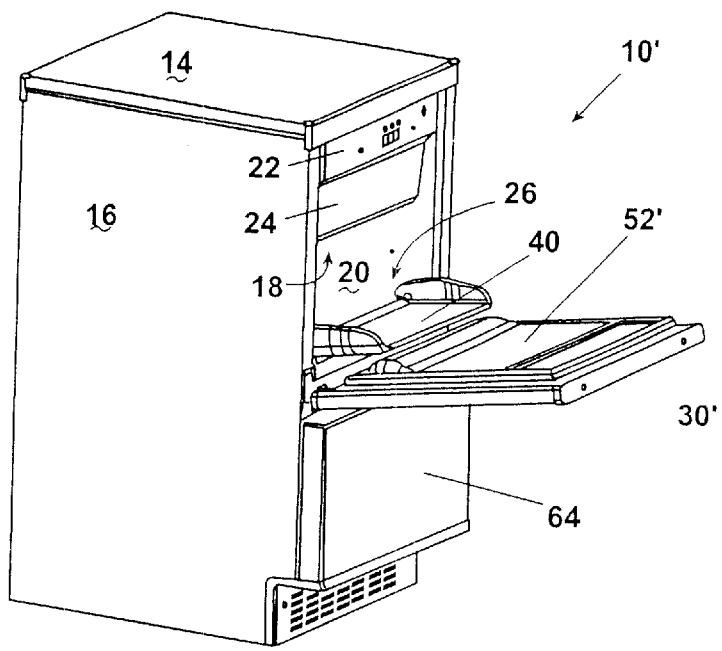
FIGS. 10 and 11 are perspective views of the novel ice maker of the present invention provided with a first alternative outer door or a drop down door that rotates about a horizontal axis, shown respectively with the inner and outer doors open and closed.
Figure 11:
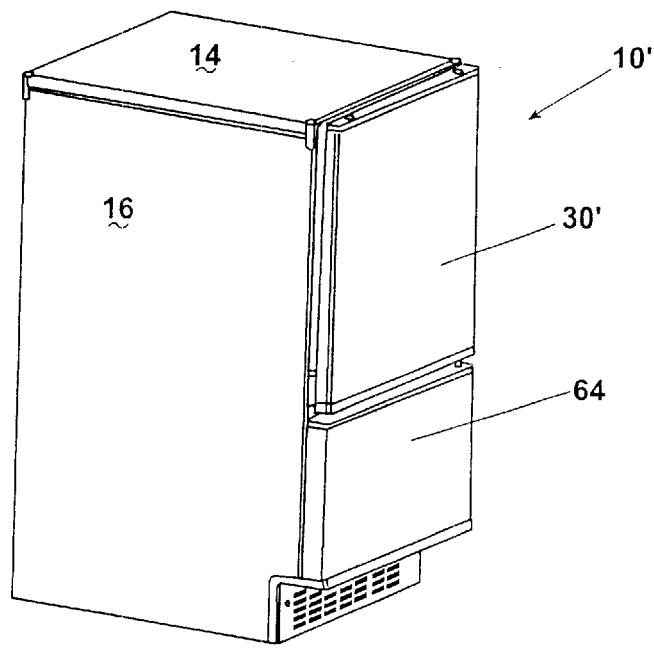

FIGS. 10 and 11 show an ice maker 10' of the present invention configured with an alternate outer door 30' that rotates about a horizontal axis. The alternate outer door 30' is approximately two-thirds the height of door 30 and is mounted such as to hinge about an axis just below and outward of the rotational axis 47 of the chute 40 such that the inner surface 52' of the door will engage and raise the chute 40 when the outer door 30' is raised and closed. A panel 64 aesthetically matching the door 30' is secured to the main housing 12 below the door 30' to close and seal the lower portion of the access opening 18.

It will be appreciated by those skilled in the art that the concave lower surface 48 of the chute 40 is adapted to cooperate with either door 30 or door 30', facilitating branded model differentiation without modifications between the ice maker 10 and the ice maker 10' other than replacing door 30 with door 30' and panel 64. While additional model differentiation may be achieved by modifications to the controls 22, the ice forming apparatus 24, and the cooling system (not shown), the manufacturer can restrict such modifications to those which provide substantive feature distinctions without needless added expense for manufacturing and inventorying alternative main housings 12 and chutes 40.

Figure 12:
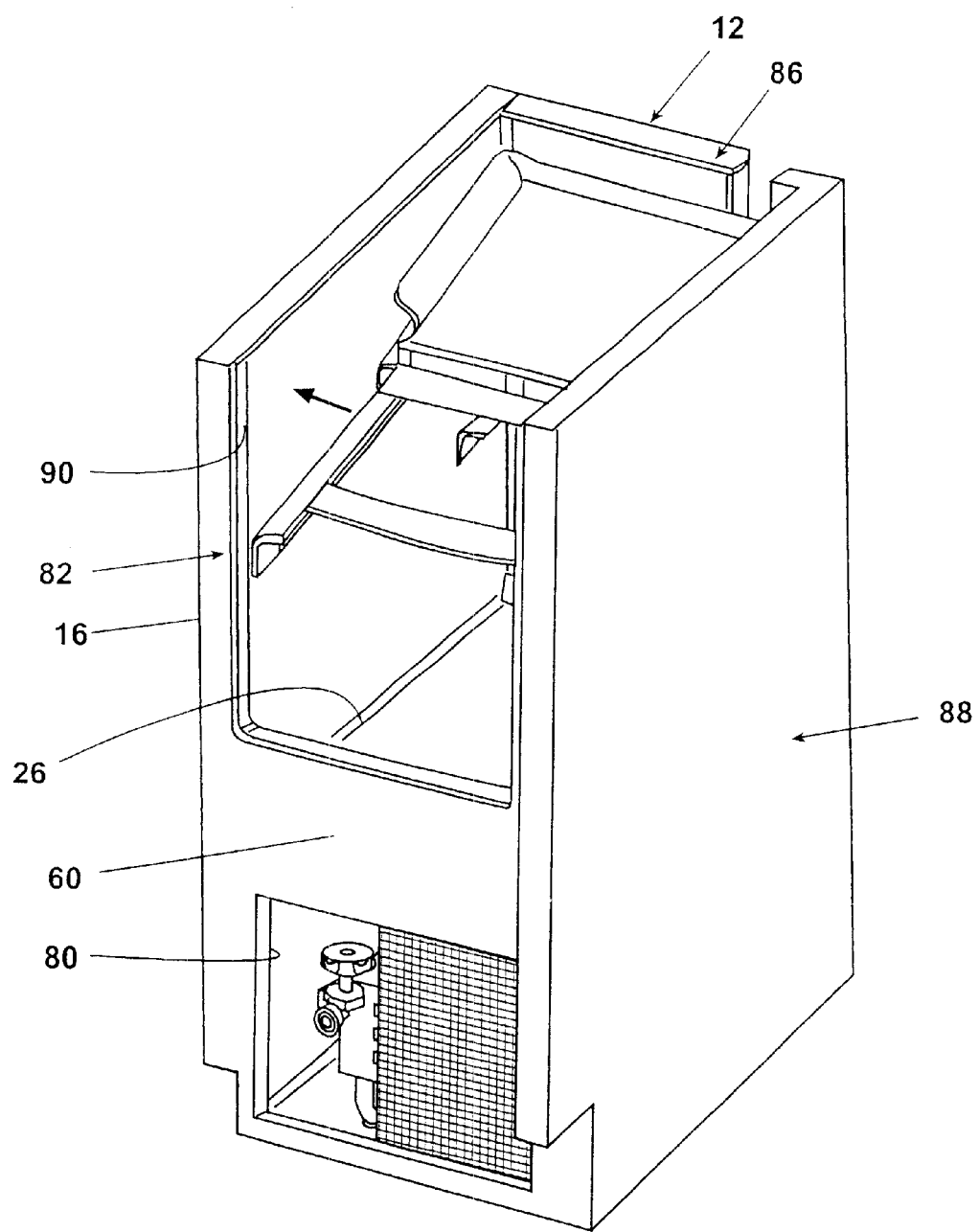
FIG. 12 is a perspective view of the main housing of the novel ice maker of the FIG. 1 with the top panel and a few selected interior components removed.
Figure 13:
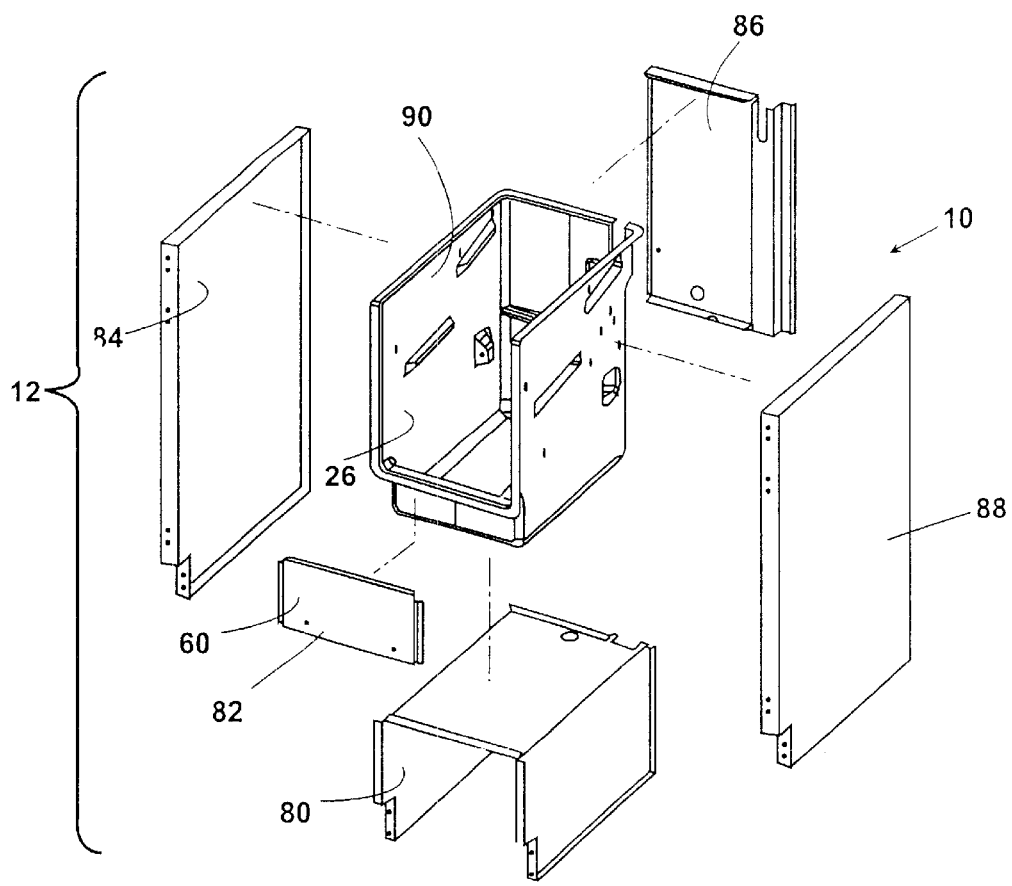
FIG. 13 is an exploded view of the novel modular components of main housing of FIG. 12.

As shown in FIGS. 12 and 13, in the preferred embodiment of the present invention, the main housing 12 is comprised of modular construction of panels 80 through 88 which may be, for example, pre-painted steel or stainless steel which are assembled with a plastic ice storage tub 90.

The side panels 84 and 88 incorporate a roll form cross-section into the four edges of the cabinet formed by the main housing 12. All other cabinet components, except the top, then fit into this common roll form section. The cross section is designed to fit the thickest component that must fit inside of it, the plastic liner, and then other components with thinner material have a formed edge, such as a hem seam, that provide them with the same effective edge thickness as the liner. All components are designed for slip fits so that they made be manually placed into position, with final sizing and positioning occurring in the foam fixture, well known in the art, used for adding insulation. A rigid foam insulation, preferably 35 mm thick, is provided between the tub 90 and the panels to maximize ice storage capacity and eliminate condensate dripping into the machine compartment.

The main housing 12 is provided with a removable top 14 (see FIG. 1) to facilitate assembly, cleaning and service from the top of the unit.

Figure 14:
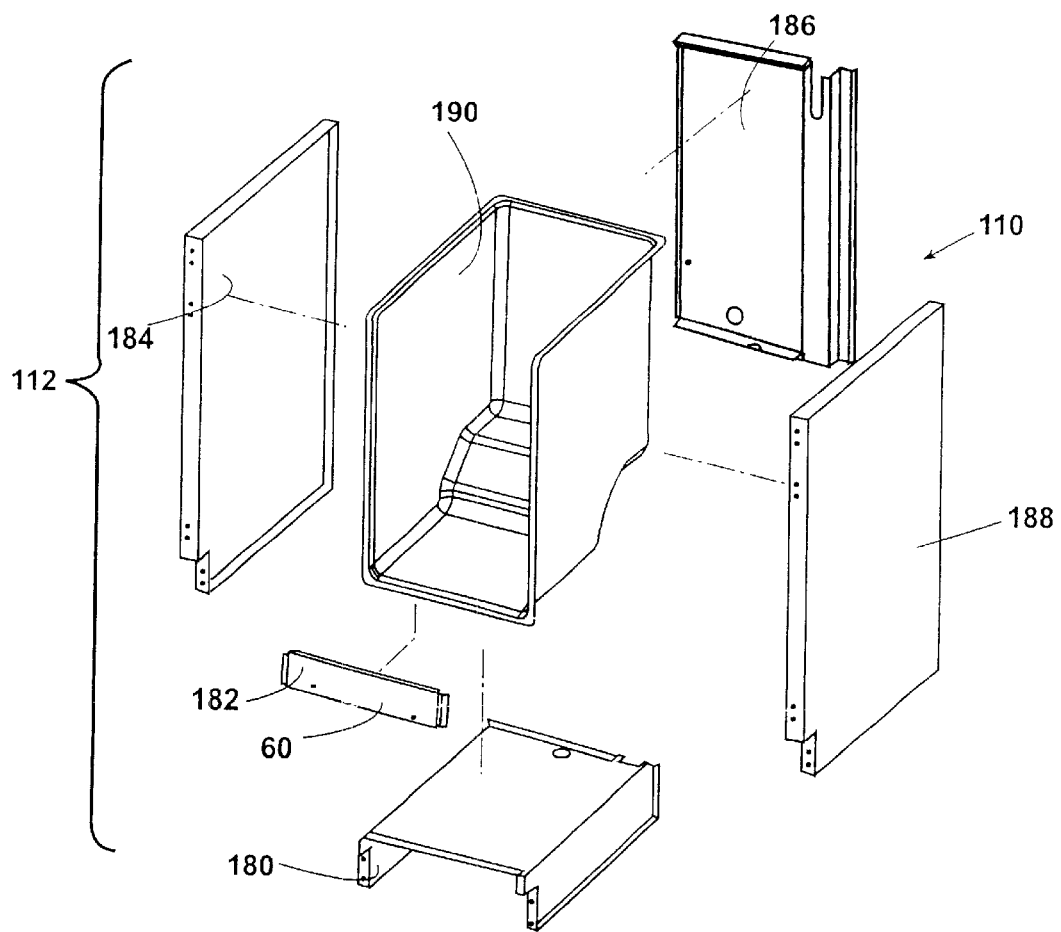
FIG. 14 is an exploded view of the novel modular components of FIG. 13 but modified for the assembly of a compact refrigerator or wine cooler from common parts with the ice maker of the present invention having an escutcheon outer door.

As shown in FIG. 14, the modular design for the main housing 12 of the ice maker 10 maybe adapted to the manufacture of a compact refrigerator 110, by substituting a refrigerator liner 190 for the plastic ice storage tub 90 and by the use of identical or modified panels 180 through 188.

It will be appreciated by those skilled in the art that the modular design for the ice maker 10 facilitates rapid assembly of the main housing 12 and the ice maker 10 or 10'. It will further be appreciated that significant cost savings and increased product offerings can be facilitated by the interchangeability of main housing components between the ice maker 10 and a compact refrigerator or a wine cooler 110. It will also be appreciated by those skilled in the art that the door 30 of ice maker 10 may be used, preferably with minor modifications to its inner surface 52 as the door for an refrigerator or wine cooler 110.

Figure 15:
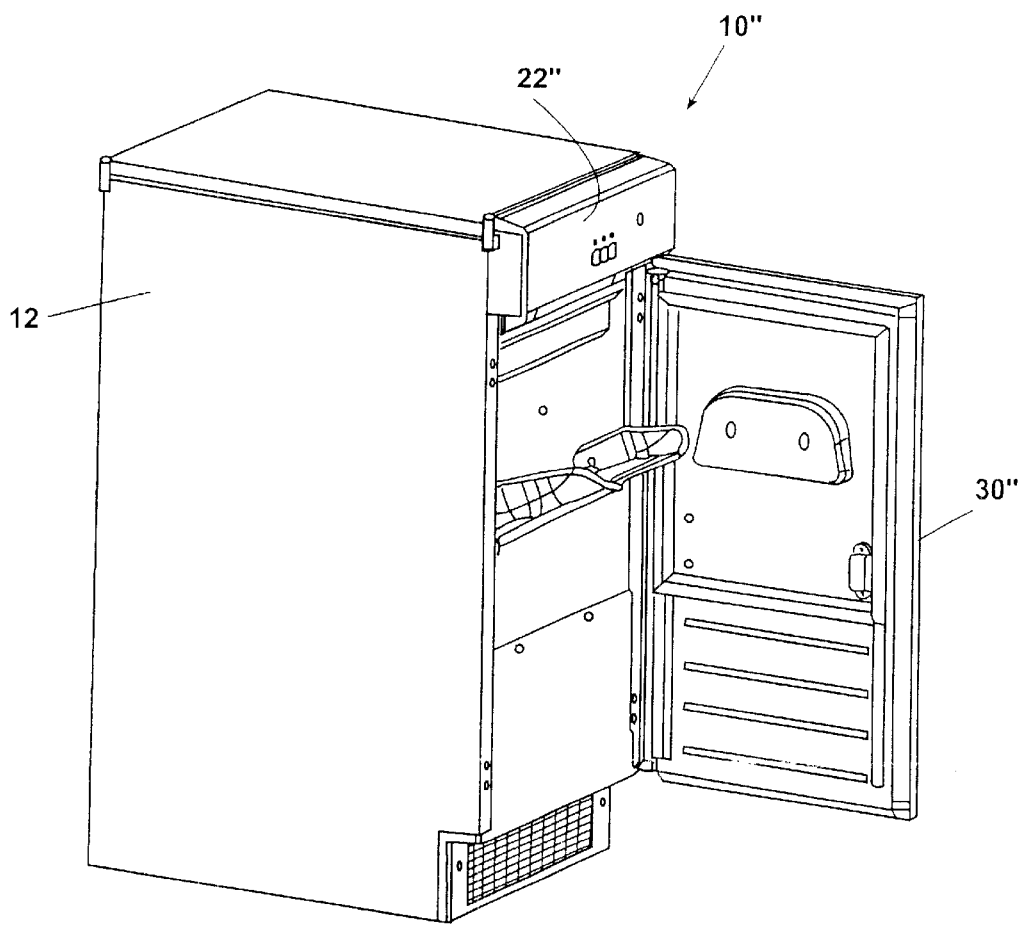
FIG. 15 is a perspective view of an alternative ice maker according to the present invention.

Additional branded model differentiation for ice makers may be achieved, as shown in FIG. 15, by providing an ice maker with a control 22' that extends outwardly from the ice storage compartment to define a front surface flush with the front surface of a door 30" of reduced height. Except for height, door 30" is similar to door 30 of ice maker 10 as shown, or similar to door 30' of ice maker 10', not shown. Such modification of the control 22' is facilitated by the modular open top construction of the ice maker frame 12.

Similarly, a wine cooler or refrigerator 110 may be provided with a control similar in footprint to control 22 or control 22' to provide brand differentiation between refrigerator and wine cooler models, but a family resemblance between similarly branded ice makers, refrigerators and wine coolers.

The above description includes the best mode contemplated at the time of filing the present invention and recites many known details, advantages and objects of the present invention, which are in no way intended to limit the scope of the claims appended hereto.

We claim:

1. A modular main housing for a predetermined one of a family of similarly configured refrigeration appliances formed of an assembly having a base;

a tub configured for said predetermined refrigeration appliance defining a storage compartment, said tub including at least a lower wall, a back wall, a pair of side walls and a partial front wall to enclose therein at least a portion of said storage compartment, said tub resting on said base and forming a tub and base subassembly;

a pair of side wall members to slip fit over opposing sides of said tub;

a rear wall member to slip fit with said side walls and said tub and base subassembly to form a tub, base and wall subassembly;

a top member attached to the top of said tub, base and wall subassembly to define a top wall for said modular main housing;

a door hingedly mounted to said main housing, such as to pivot about a preselected axis between an open position and a closed position, said door cooperating with said tub, base and wall assembly and said top member to at least partially define and enclose a refrigeration compartment for said predetermined refrigeration appliance;

an inner door hingedly mounted to said tub in a position adjacent and above said partial front wall such as to pivot about a horizontal axis to provide selective access to the interior of said tub in a first and lower position wherein said inner door is extending partially outwardly of said refrigeration compartment and to be selectively disposed in a second and raised position disposed entirely within said main housing; and an inner surface on said door facing the interior of said tub, said inner surface cooperating with said inner door such as to engage with said inner door and drive said inner door into said second and raised position as said door is rotated between said open position and said closed position.

2. The modular main housing of claim 1 wherein said preselected axis is horizontal.

3. The modular main housing of claim 1 wherein said preselected axis is vertical.

* * * * *